United States Patent [19]
Kimbrough

[11] 3,830,005
[45] Aug. 20, 1974

[54] LURE REMOVER

[76] Inventor: Clyde H. Kimbrough, 449 Brookwood Dr., Auburn, Ala. 36830

[22] Filed: Apr. 12, 1973

[21] Appl. No.: 350,352

[52] U.S. Cl. .............................................. 43/17.2
[51] Int. Cl. ........................................... A01k 97/00
[58] Field of Search ................................... 43/17.2

[56] References Cited
UNITED STATES PATENTS

| | | | |
|---|---|---|---|
| 2,488,996 | 11/1949 | Thompson | 43/17.2 |
| 2,562,413 | 7/1951 | Carr | 43/17.2 |
| 2,866,290 | 12/1958 | Karry | 43/17.2 |
| 2,940,203 | 6/1960 | Carter | 43/17.2 |

*Primary Examiner*—Antonio F. Guida
*Assistant Examiner*—Daniel J. Leach
*Attorney, Agent, or Firm*—H. C. Hogencamp

[57] ABSTRACT

A lure remover having an elongated open, round metal bar, frame around which is wound an openwork mesh hook engaging sleeve. A guide is secured perpendicularly to the rear of the frame for slidably engaging a line having a caught lure. A lowering and retrieving line has its lower end secured to the guide to guide the frame in response to manipulations of the lowering and retrieving line exerted by one hand of the user, the other hand remaining available to hold on to a fishing rod. By having the guide at the rear of the device greater mobility of the device is obtained.

2 Claims, 4 Drawing Figures

PATENTED AUG 20 1974 3,830,005

LURE REMOVER

This invention has to do with improvements in lure removers for retrieving hook-type fishing lures which have become caught on underwater objects such as stumps, rocks, weeds and the like.

Devices of this type are not new and their very number testifies to the unsolved problems their use entails. Carter U.S. Pat. No. 2,940,203 and Bortle U.S. Pat. No. 3,531,887 are believed most representative of the state of this art and will be distinguished from the present device after the same has been fully explained.

The present device includes an elongated frame covered with an openwork hook engaging sleeve and a guide at the rear of the frame for slidably engaging a line with a caught lure. A lowering and retrieving line has its lower extremity tied to the rear of the frame for manipulating the frame to disengage caught hooks of lures.

The device is further illustrated in the accompanying drawing in which.

Figure 2:
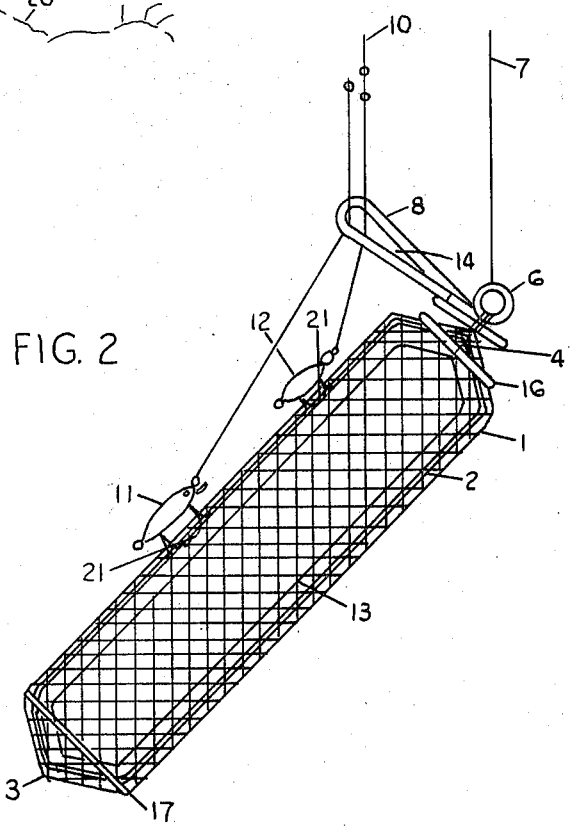
FIG. 2 is an enlarged side elevation of the lure remover used to retrieve two lures on a line.
Figure 3:
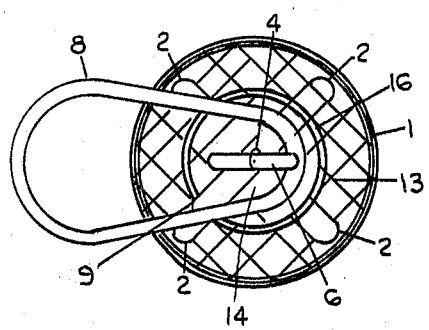
FIG. 3 is a top plan view of the rear of the remover showing the guide and the eyebolt for attaching the lowering and retrieving line.
Figure 4:
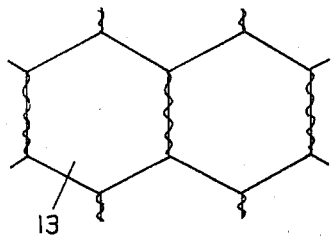
FIG. 4 is a fragmentary view of the open mesh material forming the hook engaging surface of the device.

Referring to the drawing, the present device includes an elongated rectangular open frame 1 throughout its length as detailed in FIGS. 2 and 3 made of four identical shaped metal bars 2 arranged in uniform manner and welded at their juncture at top and bottom points 3 and 4. Secured by its shank by welding or otherwise is an eyebolt 6 to which is attached one end of a 100 pound plus lowering and retrieving line 7, the other end of this line being secured to a boat or other accessible point.

Secured perpendicularly to the rear of the frame 1 by welding to the shank of eyebolt 6 is a generally pear-shaped bar ring guide member 8, the outer end of which is overlapped by about 1 inch at 9 (FIG. 3) to form an opening 14 to allow it to straddle a fishing or trolling line 10 to which lures 11 and 12 are attached. It is important that the width of this guide be about equal to the width of the frame and up to 50 percent longer than its width so that the opening in the guide is of sufficient size to freely pass lures 11 and 12. This surface is an open mesh surface such as chicken wire and preferably 1 inch in mesh width. The surface can be made by wrapping chicken wire three times around the metal frame and then securing at top and bottom with heavy gauge, soft annealed wire fasteners, 16 and 17. It will be appreciated that the assembly is heavy (2 ½ to 3 ½ lbs.) enough to readily and quickly descend the fishing line.

Figure 1:
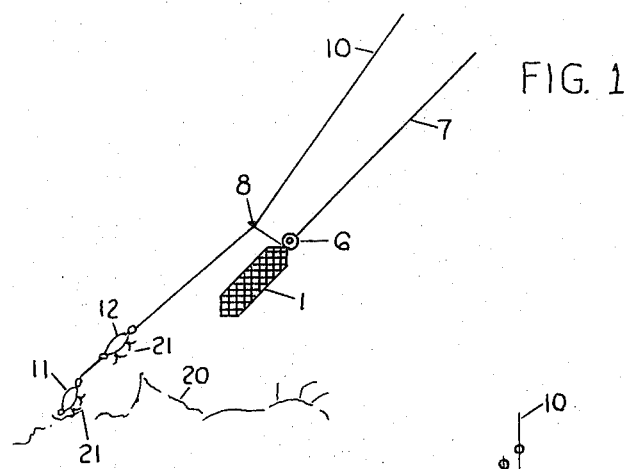
FIG. 1 is a side elevation showing the lure remover being guided along a fishing line to a lure caught on an object.

In using the described device to retrieve a hook-equipped lure or plug when its hooks 21 are caught under water on an object 20, the retrieving line is tied off in a boat like an anchor line preferably convenient to the user. After all effort at maneuvering the boat to retrieve the lure(s) comes to naught the user should locate his position in boat immediately above the hung lure. The fish line is inserted into pear-shaped ring 8 through overlap 9. As the lure remover descends, both lines should be kept reasonably tight and apart (FIG. 1). The user will know by the feel on the lure remover line and the fishing line when the lure has been reached. At that point user begins to manipulate the lure remover up and down to throw the woven wire skirt into the hook of the lure. If two hooks are snagged, with the first lure 11 loosened continue manipulating the remover until the other lure 12 is knocked loose or caught in the skirt, remembering that the two lures cannot be too far apart. The removing of one lure on descent is of little or not consequence unless, as with this device, the second lure can also be removed.

Comparing the present device with that of Bortle; the present device is designed to get one or two lures with single or multiple hooks at one descent whereas the Bortle retriever is adaptable for use in conjunction with a lure having a plurality of multiple pronged fishooks.

The present device is designed of metal throughout and maintains its shape better than a flexible nylon netting covered ring. It also is less likely to get fouled up on obstacles at or enroute to the lure. Chemical reaction of the waters being fished would act the same on metal of one kind whereas with metal and nylon it could be different.

The present device has its guide to the lure at the rear whereas the guide of the Bortle retriever is the entire width of the retriever; thus, it stops at the first lure and it would be questionable whether it would snare the second lure unless it were made of a size that would be unwieldy for normal use.

The present device's framework is a number of shaped round metal bars of the same size securely welded together without making use of any threaded connections; therefore it maintains essentially the same strength throughout all members. This is not true with the primary ring of the Bortle retriever which has an eyebolt screwed into it opposite the opening in the ring. Any connection by threading is subject to loosening. Also, the tapped hole for this eyebolt at the position shown would, under certain conditions, on hanging up at point of opening in the bar, provide leverage for breaking or deforming at the point of the eyebolt connection. The point of opening is the most likely point to hang as the line is connected to the eyebolt opposite this opening.

The present device is of such weight and construction, (weighing between 2 ½ and 3 ½ lbs.), that its descent is rapid and water can move through the openings in such fashion that water resistance is no problem. The sense of feel is such that the user knows when he has gone past the swivel and reached the lure and generally has fair knowledge of the type of object on which lures are hung such as wood, rock, or movable objects such as trotline, limb, etc. The Bortle retriever, as constructed, does not provide the user with any clue that he has reached the lure except that the point at which the retriever stops is it. In some cases, the present lure remover has been used to remove a line from around a snag or stump and to locate the lures several feet away which were hung on another object.

The present lure remover differs significantly from the Carter lure retriever as follows:

The present device is effective at getting two lures on one descent. It has been tested and shows a high degree of proficiency up to a depth of 30 feet of water. On 28 descensions for two lures, 52 were removed and four were left, but three additional lures were picked up with portions of two broken lines. Five descents were made for single lures and all were recovered. The lure remover is effective at depths greater than 30 feet. It would appear that the effectiveness of Carter's lure retriever is limited primarily to the waters where the hung lures or the retriever head are visible as indicated. Too, the longer the handle the more unwieldy the lure retriever becomes. This, in many cases, would limit the user to near surface removal as managed fertilized lakes try to maintain visibility at 18 inches plus or minus and often streams and larger bodies of water are generally limited to 4 or 5 feet when the body of water is considered clear. However, visibility in the water has little or no effect on the effectiveness of the present lure remover.

The present device is designed with the guide at the rear. The pear-shaped guide ring descends to the lure(s) with the wire skirted portion of the lure remover in position to be manipulated into the hooks or the lures. With the Carter lure retriever, which has a front guide, it would appear that if the descension were made for two lures at a depth they could not be seen, the guide at front end of retriever would stop at first lure and only by chance pick up the second lure.

The present device uses a 100 lb. plus, tested line for lowering, manipulating and raising the lure remover, whereas the Carter device uses an elongated handle made up of multiple sections joined together by screwing one section into another making use of male and female fittings that are threaded. There is no mentioning of the locking devices at each connection, therefore, any manipulation of this handle may cause the retriever to become disassembled. These connecting parts would be the weak points making up the device. The present lure remover is assembled by welding and makes no use of threaded connections.

The foregoing described structure is illustrative only and may be modified within the terms of the following claims.

I claim:

1. A lure remover for retrieving caught casting and trolling lures from underwater objects, comprising in combination: an elongated rectangular open frame, formed of four identical equispaced round metal bars which are parallel with each other throughout most of their length and disposed in square formation, said bars being shaped or bent near each end to taper toward and meet at common central points and being firmly joined together as by welding at each of the two common central juncture points; an eyebolt or ring firmly joined to said open frame at one of said common central juncture points; a generally pear-shaped guide having an opening of sufficient size for slidably straddling a lure and a line attached to said lure, said open guide being formed from the same round metal bar material as the open frame and being firmly attached to said frame in perpendicular relationship thereto at the same juncture point as the eyebolt or ring; an openmesh material wound around said open frame and fastened thereto in such manner as to form a cylindrical reticulated outer surface; and a lowering and retrieving line attached to said eyebolt or ring.

2. The device as set forth in claim 1 wherein said open pear-shaped guide includes means for inserting and removing the line to which the caught lure is attached.

* * * * *